United States Patent
Korat et al.

(10) Patent No.: US 9,787,665 B2
(45) Date of Patent: Oct. 10, 2017

(54) SYSTEM AND METHOD FOR PROVIDING SINGLE SIGN ON INTERFACE FOR APPLICATIONS ON MOBILE DEVICES

(71) Applicant: Verizon Patent and Licensing Inc., Basking Ridge, NJ (US)

(72) Inventors: Mukeshkumar Korat, Irving, TX (US); Jamal A. Alvi, Mullica Hill, NJ (US); Chung-Bun B. Hwang, New Milford, NJ (US); Aarathi Kalianda, Malvern, PA (US); Sivaguru Eknath, Tamil Nadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 669 days.

(21) Appl. No.: 13/933,705

(22) Filed: Jul. 2, 2013

(65) Prior Publication Data

US 2015/0012995 A1    Jan. 8, 2015

(51) Int. Cl.
*G06F 15/16* (2006.01)
*H04L 29/06* (2006.01)
*H04W 12/06* (2009.01)

(52) U.S. Cl.
CPC ......... *H04L 63/0815* (2013.01); *H04W 12/06* (2013.01)

(58) Field of Classification Search
CPC .... G06F 21/41; H04W 12/06; H04L 63/0815; H04L 63/08
USPC ......... 726/2-8; 713/168-174, 182-186, 202; 709/206, 225, 229, 249, 389
See application file for complete search history.

(56) References Cited

U.S. PATENT DOCUMENTS

| | | | | |
|---|---|---|---|---|
| 2008/0168542 A1* | 7/2008 | Sato | ......................... | G06F 21/34 726/5 |
| 2010/0077469 A1* | 3/2010 | Furman | ................... | G06F 21/41 726/8 |
| 2011/0320616 A1* | 12/2011 | Wray | .................... | H04L 63/102 709/228 |
| 2013/0212661 A1* | 8/2013 | Neafsey | .................. | G06F 21/45 726/6 |
| 2013/0297513 A1* | 11/2013 | Kirillin | .................. | G06Q 40/02 705/67 |
| 2014/0082715 A1* | 3/2014 | Grajek | ................ | H04L 63/0815 726/8 |
| 2014/0109197 A1* | 4/2014 | Schneider | ................. | G06F 8/61 726/4 |
| 2014/0282894 A1* | 9/2014 | Manton | ................. | H04L 63/102 726/4 |

\* cited by examiner

*Primary Examiner* — Evans Desrosiers (57) ABSTRACT

A system for and method of providing a mobile device user with a mobile single sign-on (MSSO) platform that can interface with multiple mobile applications on the mobile device. A user having a mobile device may access a mobile application on the mobile device. The mobile application may be enabled to interface with the MSSO platform. The MSSO platform may capture the user credentials sent over a wireless link and provide them to a remote server. The remote server may establish a session over a wireless link with the mobile device based on the user credentials. The MSSO platform may make this session available to other applications on the mobile device seamlessly. The wireless link may be part of a publicly accessible communication network.

23 Claims, 4 Drawing Sheets

SYSTEM AND METHOD FOR PROVIDING SINGLE SIGN ON INTERFACE FOR APPLICATIONS ON MOBILE DEVICES

BACKGROUND INFORMATION

As the processing power and memory of hand held computing devices (such as smartphones) continues to evolve, businesses and organizations are increasingly relying on these devices to provide goods and services to customers and employees through mobile applications. For example, many businesses are now providing enterprise applications to their employees for use on company-provided mobile devices (or on personally-owned mobile devices). Enterprise applications that run on the mobile devices often require a user to sign-on and/or sign-off in order to securely access one or more private networks.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Mobile applications on a mobile device may perform multiple functions for a user. A mobile application may be a software program designed to run on a mobile device. In a business context, a business may provide mobile applications to its employees for use on their mobile devices, which may be company issued or personally owned. The employees may use the mobile applications to access a private network operated by or for the business and exchange data and information with one or more servers or network enabled computers (that are part of the private network) and the employee's mobile device. The private network may be a virtual private network (VPN). The mobile applications may allow the user to access protected resources on the private network that are not otherwise available.

Single Sign On (SSO) is a session/user authentication and/or authorization process that permits a user to enter one set of credentials (for example, a username/password combination) in order to access multiple applications on his mobile device. The process authenticates the user for all the applications they have been given rights to and eliminates further prompts when they switch applications during a particular session. The user's mobile device may include a Mobile Single Sign On (MSSO) application that provides the mobile device user (such as an employee of a business) with authentication services to enable the user to access multiple mobile applications using a single sign-on interface.

A mobile user may access a mobile application and sign-on to a secure network using functionality provided by the MSSO application that has been integrated with the mobile application. A session may be established that allows the user to exchange data and information with the private network. The MSSO application allows the session to be commonly shared with other applications on the mobile device, thus ensuring that the user does not need to separately sign-in each time he accesses a different application.

MSSO may utilize a pre-existing SSO infrastructure designed for stationary computing devices, such as desktop computers. MSSO may allow users to sign in once and access some or all MSSO-enabled mobile based applications seamlessly upon respective application invocation.

The description below describes servers, devices, and network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, network elements, telephony devices, etc.) separately. The functions described as being performed at various components may be performed at other components, and the various components may be combined and/or separated. Other modifications also may be made.

Figure 1:
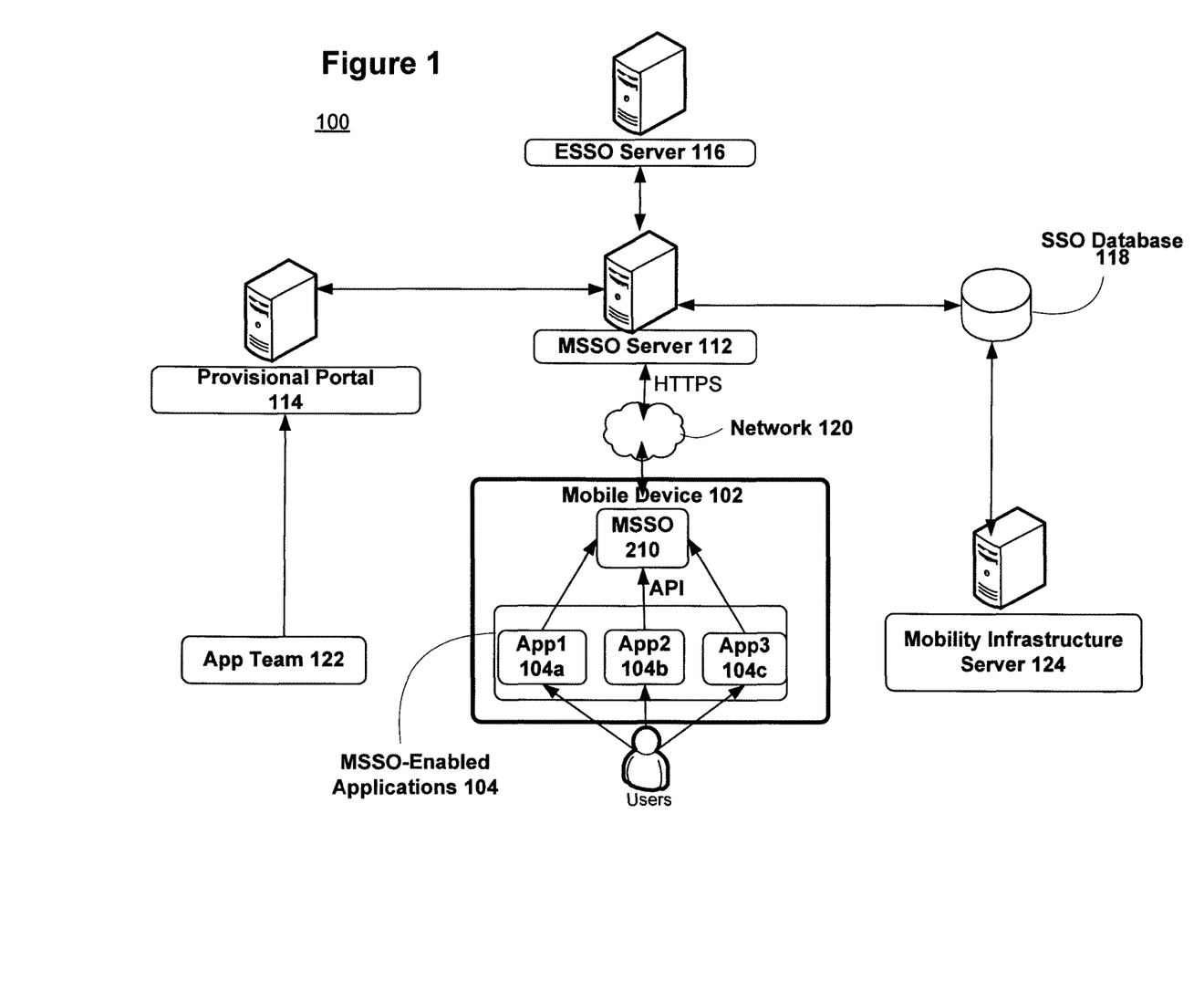
FIG. 1 is a schematic diagram illustrating a system according to a particular embodiment.

FIG. 1 is a schematic diagram of a system for providing MSSO services to users of mobile devices. As shown in FIG. 1, in an exemplary embodiment, a system 100 may include a mobile device 102, MSSO server 112, Provisional portal 114, ESSO server 116, SSO database 118, network 120, and Mobility infrastructure server 124. It is noted that system 100 illustrates a simplified view of various components included in a system for providing MSSO services to users, and that other hardware devices and software not depicted may be included in the system 100. It is also noted that the system 100 illustrates only a single exemplary instance of each component. It will be appreciated that multiple instances of these components may be used. Moreover, the system 100 may include other devices not depicted in FIG. 1.

As used herein, the term mobile device may be, for example, a tablet computer, a smartphone, a cellular device, a handheld PC, a PDA, a laptop computer, a satellite phone, a handheld MP3 player, a handheld video player, a personal media player, a gaming devices, or other devices capable of communicating with MSSO server 112.

As shown in FIG. 1, mobile device 102 may be equipped with one or more MSSO-enabled mobile applications 104, such as App1 104a, App2 104b, and App3 104c. An application that is MSSO-enabled (such as App1 104a) may interact and interface with the MSSO application 210 on the mobile device 102. Each mobile application 104 may perform one or more functions. The mobile applications 104 may be business-related enterprise applications. For example, App1 104a may be a time-keeping application that allows a user to keep track of time spent on different work-related projects. App1 104a may allow the user to periodically submit time-keeping records to one or more servers via a secure network. App1 104a may present a user interface for receiving the user's authentication information and an interface for receiving the project-related man hour values. In another exemplary embodiment, App2 104b may be a human resources application that allows the user to securely access, upload, and/or download HR-related information associated with that employee. The MSSO-enabled applications 104 may be configured to exchange data and information with a company-controlled network or group of servers through a secure session between the mobile device 102 and MSSO Server 112. The mobile applications 104 may be installed on mobile device 102. The mobile applications 104 typically present one or more user interfaces for receiving a user's authentication information, such as a username and password. The mobile applications 104 cause the mobile device they run on to authenticate the user, and thus the device, to MSSO server 112 over a long range wireless link that is publicly accessible.

Mobile device 102 may include MSSO application 210. MSSO application 210 may provide the mobile applications with mobile single sign-on functionality for the user or users of mobile device 102. MSSO application 210 may provide sign-on, sign-off, user authentication, user registration, and other functions. MSSO application 210 may include one or more Application Programming Interfaces (APIs) that allow MSSO 210 to interface and/or interact with each of mobile applications 104. The operation and components of MSSO application 210 will be described in greater detail in connection with FIG. 2.

As shown in FIG. 1, system 100 may include one or more network-enabled computers such as MSSO Server 112, Mobility Infrastructure server 124, Provisional Portal 114, and ESSO Server 116. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a router, a thin client, a fat client, an Internet browser, or other device. The network-enabled computers may execute one or more software applications to, for example, receive data as input from an entity accessing the network-enabled computer system, process received data, transmit data over a network, and receive data over a network. The one or more network-enabled computers may also include one or more software applications to enable MSSO services, as described herein.

MSSO Server 112, Provisional Portal 114, Mobile Device 102, ESSO Server 116, SSO Database 118, and Mobility Infrastructure Server 124 may provide Application Programming Interfaces ("APIs"), interface tables, Remote Procedure Calls ("RPCs"), web services, Extensible Markup Language ("XML") based interfaces, Simple Object Access Protocol ("SOAP") based interfaces, Common Object Request Broker Architecture ("CORBA") and other interfaces for sending or receiving media searches, preferences or other information.

Network 120 may be a wireless network, a wired network or any combination of wireless network and wired network. For example, network 120 may include one or more of a fiber optics network, a passive optical network, a cable network, a telephony network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 120 may include, without limitation, telephone line, fiber optics, IEEE Ethernet 802.3, a wide area network ("WAN"), a local area network ("LAN"), or a global network such as the Internet. Also, network 120 may support an Internet network, a wireless communication network, a cellular network, or the like, or any combination thereof. Network 120 may further include one, or any number of the exemplary types of networks mentioned above operating as a stand-alone network or in cooperation with each other. Network 120 may utilize one or more protocols of one or more network elements to which it is communicatively coupled. Network 120 may translate to or from other protocols to one or more protocols of network devices. Although network 120 is depicted as one network, it should be appreciated that according to one or more embodiments, network 120 may comprise a plurality of interconnected networks, such as, for example, a service provider network, the Internet, a broadcaster's network, a cable television network, corporate networks, and home networks.

Mobile device 102 and MSSO Server 112 may transmit and receive data to and from network 120 representing broadcast content, user request content, parallel search queries, parallel search responses, and/or other data. The data may be transmitted and received utilizing a standard telecommunications protocol or a standard networking protocol. For example, one embodiment may utilize Hypertext Transfer Protocol Secure (HTTPS). Another embodiment may utilize Signaling System Number 7 (SS7). In other embodiments, the data may be transmitted and received utilizing Session Initiation Protocol ("SIP") or H.323. In other embodiments, the data may be transmitted and/or received utilizing using Voice Over IP ("VOW"). In other embodiments, the data may be transmitted and/or received using Voice Over LTE ("VoLTE") or messaging protocols. Data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection.

SSO database 118 may be network accessible storage and may be local, remote, or a combination thereof to MSSO Server 112, Mobility Infrastructure Server 124, Provisional portal 114, or ESSO Server 116. SSO database 118 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, SSO database 118 may be a database, such as an Oracle database, a Microsoft SQL Server database, a DB2 database, a MySQL database, a Sybase database, an object oriented database, a hierarchical database, or other database. SSO database 118 may utilize flat file structures for storage of data.

Provisional portal 114 may provide an application registration process for App team 122, as will be described in greater detail in connection with FIG. 4. App team 122 may be a group of one or more development teams that create mobile applications, such as App1 104a. Provisional portal 114 may allow one or more app teams 122 to register applications so that they are MSSO-enabled. App team 122 may develop one or more applications for use on mobile device 102.

MSSO Server 112 may be configured to facilitate secure sessions and exchange data with mobile device 102 and mobile applications 104. MSSO Server 112 may exchange information and data with MSSO application 210. The functions performed by MSSO Server 112 will be described in greater detail in connection with FIGS. 2-4.

Mobility Infrastructure Server 124 may be configured to authenticate mobile device 102. If mobile device 102 is a Blackberry device, Mobility Infrastructure server 124 may provide Blackberry Enterprise Service (BES). If mobile device 102 is a non-Blackberry device, Mobility Infrastructure server 124 may provide Good Technology. Mobility infrastructure server 124 may capture a device identifier associated with the mobile device and user information during the device registration process, which will be described in greater detail in connection with FIG. 3.

SSO Database 118 may store user profiles associated with a user of a mobile device. SSO database 118 may store device identifiers associated with each mobile device. SSO database 118 may store application keys associated with each MSSO-enabled mobile application, such as App1 104a. These and other functions will be described in greater detail in connection with FIGS. 2-4.

MSSO 210 may provide a common sign on/sign off interface for some or all MSSO-enabled applications. MSSO 210 may be directly installed on mobile device 102. MSSO 210 may allow a user of mobile device 102 to access all MSSO-enabled applications 104 using a single sign-on/sign-out interface, as well as other common security related features. MSSO application 210 may provide common user management services to a user of mobile device 102.

MSSO application 210 may offer one or multi-factor authentication mechanisms. Authentication may be provided through a stand-alone mobile based user interface, as will be described in greater detail in reference to FIG. 3. MSSO 210 and MSSO Server 112 may provide direct, workflow integration with ESSO Server 116. ESSO Server 116 may be configured to provide the user-based identity management and access control services to various enterprise applications which enforce authentication, policy-based authorizations and auditing with identity administration functionality. Enterprise SSO services may be handled by third party providers such as CA Siteminder™ or Oracle Access Manager™.

MSSO 210 may mask the communication complexity between MSSO-enabled mobile applications 104, MSSO Server 112, ESSO Server 116, and/or SSO Database 118.

Figure 2:
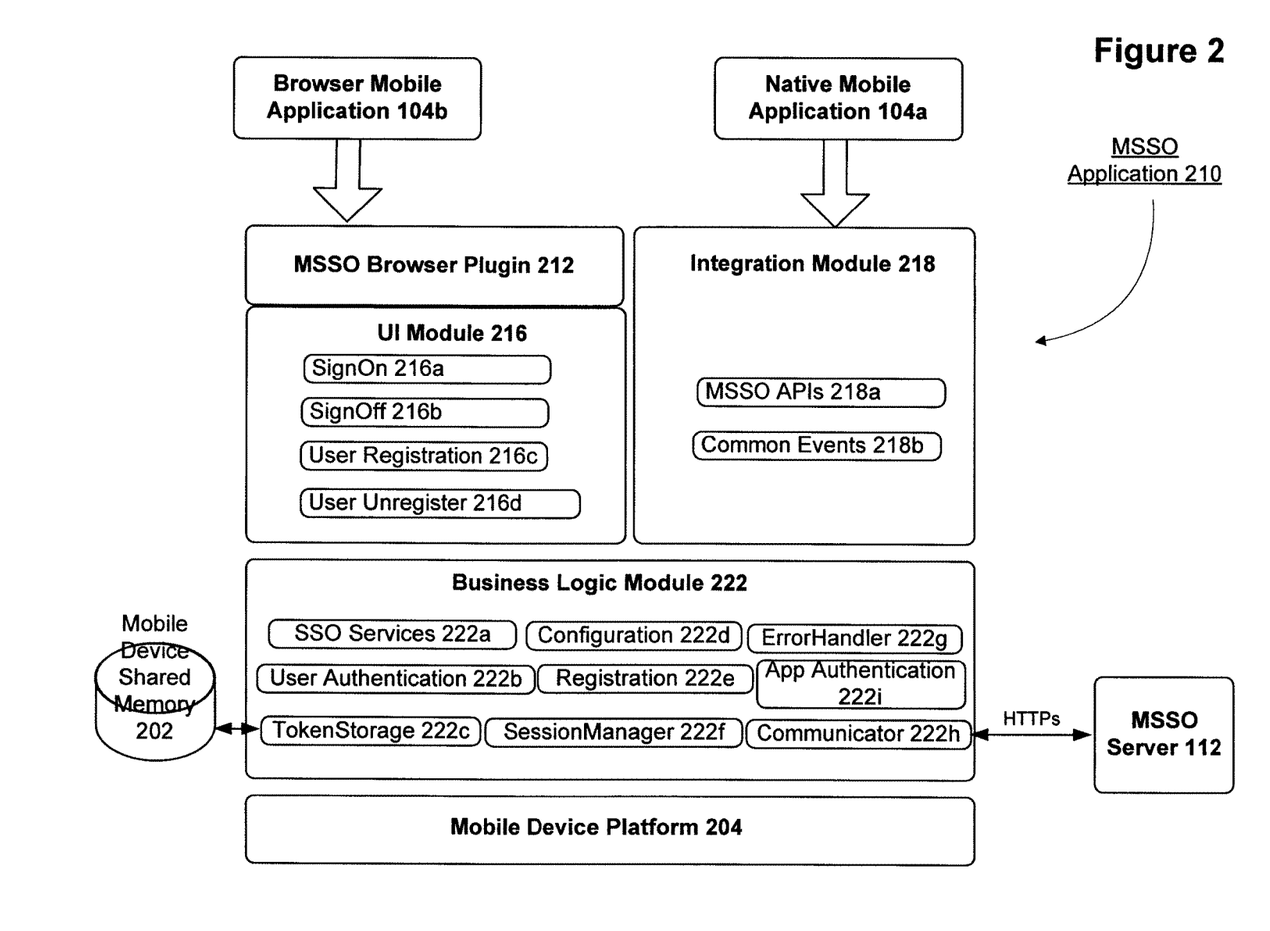
FIG. 2 is a schematic diagram illustrating the components of an MSSO application, according to a particular embodiment.

FIG. 2 is a schematic diagram of the components of MSSO application 210, according to an exemplary embodiment. As shown in FIG. 2, MSSO application 210 may comprise one or more modules to provide various functions associated with providing mobile single sign-on services in accordance with the embodiments of the present invention. In the exemplary embodiment shown in FIG. 2, MSSO application 210 may comprise MSSO browser plugin 212, User-Interface (UI) Module 216, Integration module 218, and Business logic module 222.

MSSO 210 and its components may also interact with other components and devices, such as those shown in FIG. 1. MSSO application 210 may reside on mobile device platform 204. Mobile device platform 204 may include one or more software development kits (SDKs) and/or operating systems on mobile device 102. For example, if mobile device 102 is an iPhone®, the mobile device platform 204 may be iOSMobile. If mobile device 102 is an Android® device, device platform 204 may be an Android platform. Mobile device platform 204 may be a Blackberry® platform for Blackberry devices. Mobile device platform 204 may be a Windows® mobile platform. iPhone and iOS are registered trademarks of Apple, Inc.; Android is a registered trademark of Google, Inc.; and Blackberry is a registered trademark of RIM, Inc.

MSSO Browser plugin 212 may provide an interface for one or more browser based mobile applications 104b to interact with MSSO application 210. Mobile application 104b may be a browser-based application that may be accessed by mobile device 102 using one or more mobile browsers. Mobile browsers may include Safari®, Firefox®, Google Chrome®, and other similar mobile browsers. Chrome is a registered trademark of Google, Inc.; Firefox is a registered trademark of the Mozilla Foundation; and Safari is a registered trademark of Apple, Inc.

UI Module 216 may include one more modules for capturing user events. UI Module 216 may interface with an MSSO-enabled mobile application, such as mobile application 104a, to capture user input to sign-on, sign-off, register, and unregister. UI module 216 may send the captured user events to Business Logic Module 222. SignOn module 216a may capture an event when a user signs on to native mobile application 104a or browser mobile application 104b. SignOn Module 216a may provide one or more interfaces on mobile device 102 where a user can enter user credentials, such as a username and/or password to sign on to a native mobile application or a browser-based application. Other identifying information may be used as user credentials. The interface may be accessible as part of the mobile application 104a or mobile application 104b.

Once a user enters his or her credentials into the interface, UI Module 216 may pass this information to User Authentication module 222b of Business logic module 222. SignOff Module 216b may provide one or more interfaces on mobile device 102 where a user can sign-off from a native mobile application 104a or browser mobile application 104b. User registration module 216c may provide one or more interfaces where a user can create or activate a profile so that he or she can access a native mobile application 104a or browser mobile application 104b using MSSO application 210. The profile may include a user name, first name, last name, a password, email address, and other personally identifying information associated with the user. User unregister module 216d may provide one or more interfaces where a user can delete or modify his or her profile. Once this information is entered, UI Module 216 may pass it to Business Logic Module 222, which then may pass it to MSSO Server 112 using, for example, Integration module 218 may interact with native mobile application 104a. Integration module 218 may include one or more software development kits (SDKs) for MSSO Application 210. Integration module may include one or more application programming interfaces (APIs), such as MSSO APIs 218*a* that are exposed to the code base of a native mobile application 104*a*. As used herein, the term "native mobile application" refers to a mobile application that is installed on mobile device 102 and runs directly on mobile device 102. Common events module 218*b* may expose the user action events to the code base of the native mobile application 104*a* to capture common events, such as when a user signs on, signs off, or when a timeout event occurs. Integration module 218 may provide an interface between native mobile application 104*a* and UI module 216 and Business logic module 222. MSSO APIs module 218*a* may allow native mobile application 104*a* to invoke various modules of UI Module 216 and/or Business Logic module 222.

Business Logic Module 222 may provide a number of functions for MSSO Application 210. Business Logic Module may include a number of sub-modules: SSO Services module 222*a*, User Authentication module 222*b*, TokenStorage module 222*c*, Configuration module 222*d*, Registration module 222*e*, SessionManager module 222*f*, ErrorHandler module 222*g*, Communicator module 222*h*, and App Authentication module 222*i*. Business logic module 222 may exchange data and information with MSSO server 112 using communicator module 222*h*.

SSO Services 222*a* may expose all the Business Logic Module 222 functionality to UI Module 216 using an abstract interface. SSO Services module 222*a* may provide receive sign-on, sign-off, user registration and user un-registration information from the sub-modules of UI Module 216. SSO Services module 222*a* may pass this information to MSSO Server 112. SSO Service module 222*a* may decouple the UI Module 216 and Business Logic module 222 design so that it can be port easily based upon the mobile device platform 204 that is being used.

User authentication module 222*b* may receive user credentials from UI Module 216. User credentials may include a username and password associated with the user. User credentials may include biometric information associated with the user. User credentials may include other information that is uniquely associated with a user of mobile device 102.

Token storage module 222*c* may store session information in shared memory 202. The stored session information may allow the mobile application 104 to access the secure network via MSSO Server 112. Session information may be stored in the form of a session cookie. Session information may be stored as a token. As will be described in connection with FIG. 3, upon the successful authentication of user credentials, the mobile application can access the protected resources on the secure network using this session information. The session information may be shared amongst MSSO-enabled applications on mobile device 102.

The session information (for example, the token) may be issued by MSSO Server 112 after a user has been successfully authenticated. The session information (for example, the token) may be encrypted at MSSO Server before it is received by mobile device 102. When the user of mobile device 102 attempts to access protected resources on the secure network, the mobile application must present the token (session information) to MSSO Server 112. The process of storing session information will be described in greater detail in connection with FIGS. 3 and 4.

Configuration module 222*d* may receive client side common configuration information. The configuration information may be communication parameters, such as the domain name, IP address, port number, and other server specific data for MSSO server 112.

App authentication module 222*i* may receive application-specific credentials for an MSSO-enable mobile application. The application credentials may be received from MSSO APIs 218*a*. This module 222*i* authenticates the application credentials issued during the engagement process (described in connection with FIG. 4) and unlock the set of APIs functionality from MSSO APIs module 218*a*. If an application fails to provide its credentials, then all its subsequent attempts to call MSSO APIs 218*a* may blocked as unauthorized status.

Session Management Module 222*f* may manage a current session of a user on mobile device 102. Module 222*f* may also manage the single sign on session timeout and application specific timeout setting and generate the common events and notify the UI Module 216 and Common Events module 218*b* so that all MSSO-enabled applications may be synchronized with common functionalities.

Registration module 222*e* may receive the user registration information from UI Module 216. The user registration information may include a logon id or user name, a first name, last name, mobile phone number, email address, or other unique identifying information associated with the user of mobile device 102.

ErrorHandler module 222*g* may capture information related to errors for other modules within business logic module 222. This may include mobile device-server communication errors, business logic errors and mobile device platform 204 specific exceptions.

Mobile device shared memory 202 may be memory on mobile device 102 that has been allocated by MSSO application 210 for storing session information (a token) when a user has successfully signed-on using the mobile single-sign on. Shared memory 202 may be accessible by every mobile application running on mobile device 102. Session information stored in shared memory 202 may be available to every MSSO-enabled mobile application on mobile device 102 via MSSO application 210.

Figure 3:
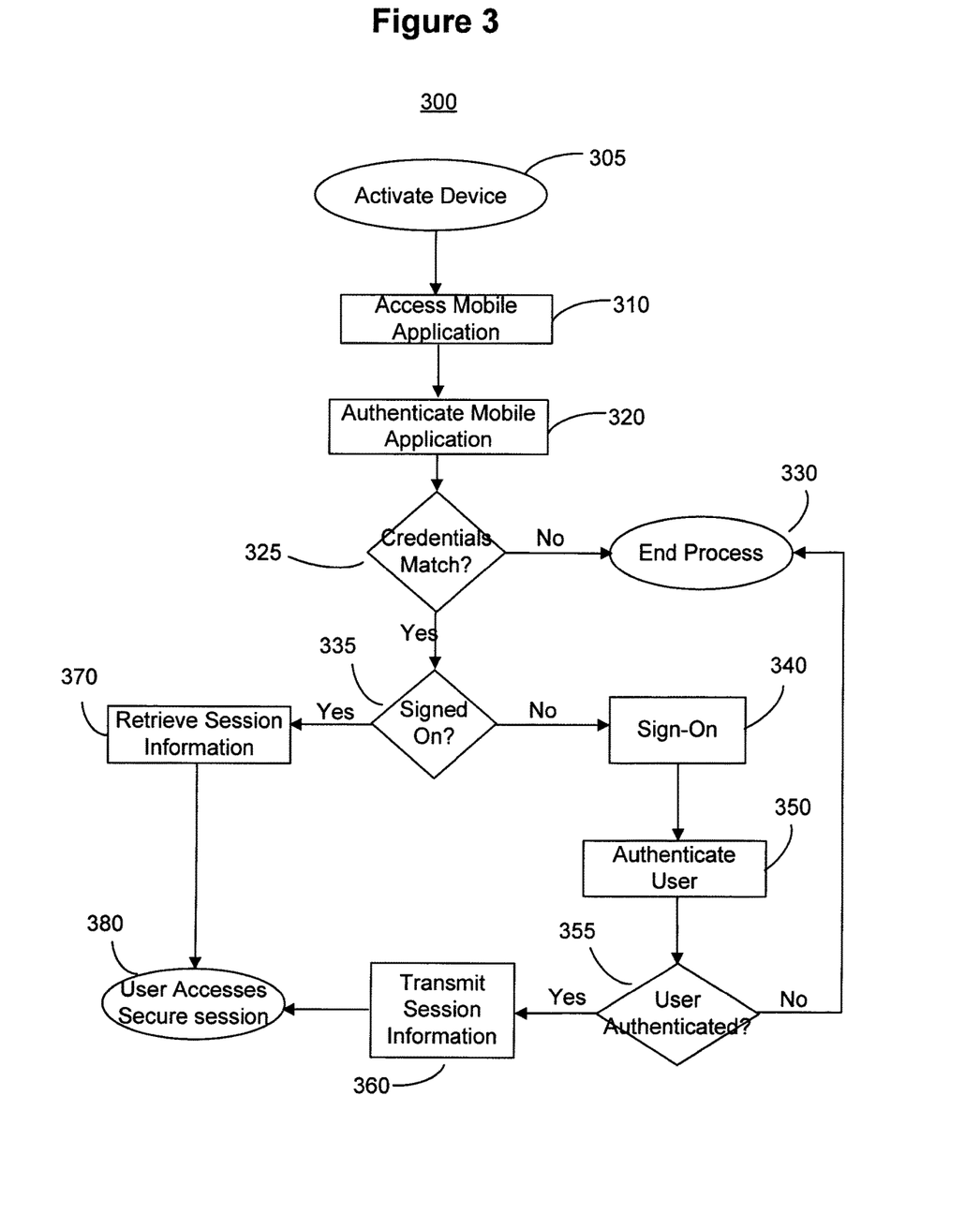
FIG. 3 is a block diagram of a method of a particular embodiment.

FIG. 3 illustrates a flow diagram of a method 300 for authenticating and accessing a mobile application using an MSSO application. This exemplary method 300 is provided by way of example, as there are a variety of ways to carry out the method. The method 300 shown in FIG. 3 can be executed or otherwise performed by one or a combination of various systems. The method 300 described below may be carried out by the systems shown in FIGS. 1 and 2, by way of example, and various elements of system 100 are referenced in explaining the exemplary method of FIG. 3. Each step shown in FIG. 3 represents one or more processes, methods or subroutines carried out in exemplary method 300. Referring to FIG. 3, exemplary method 300 may begin at block 305.

At block 305, method 300 may activate the device. The device may be activated in conjunction with mobility infrastructure server 124. Each mobile device may have a unique device identifier (id). The device id may have been pre-stored on the mobile device. The device id may be supplied by mobility infrastructure server 124. A user may use mobile device 102 to provide mobility infrastructure server 124 with the device id. This process may be done electronically.

As part of the device activation step, the user may transmit user credentials to mobility infrastructure server 124. The user credentials may be a username and/or a password or any other user associated attribute. The user credentials may be biometric information associated with the user (e.g., retinal scan, fingerprint, voice print/recognition, DNA information, etc.). The user may create the username and password. The user credentials may be created by the mobility infrastructure server 124.

Mobility infrastructure server 124 may store the user credentials and device identifier in SSO database 118. Mobility infrastructure server 124 may create a user profile based on the user credentials and the device id. The user profile may be stored in SSO database 118.

Mobility infrastructure server 124 may search the SSO database 118 for the device id to determine whether the device identifier has already been associated with a different user profile. If Mobility infrastructure server 124 determines that the device identifier is already associated with another user profile, mobility infrastructure server 124 may end the activation process and transmit a notification to the user of mobile device 102, informing him that the device id is registered to a different user. In another embodiment, mobility infrastructure server 124 may update the information stored in SSO database 118 so that the device id is associated with the most recently-received user credentials. Mobility infrastructure server 124 may confirm that the user associated with the older user credentials is no longer using the mobile device having the device id in question. Method 300 may proceed to step 310.

At step 310, the user may access a mobile application on his mobile device. The application may be a native application, such as native application 104a shown in FIG. 2. The application may be a browser-based application, such as application 104b shown in FIG. 2. The application may be have been MSSO-enabled, a process described in greater detail in connection with FIG. 4.

Mobile application 104a may allow the user to access a secure network in order to exchange data between the mobile device and the secure network. Mobile application 104a may access a secure network via MSSO server 112. For example, mobile application 104a may be a timekeeping application for an employee who is working remotely. The employee may access the timekeeping application on his company-provided mobile device. Method 300 may proceed to step 320.

At step 320, the mobile application may be authenticated. Mobile application 104 may interface with MSSO application 210 on mobile device 102. MSSO application 210 may have been previously installed on mobile device 102. MSSO application 210 may be integrated with mobile application 104 via one or more APIs on Integration module 218 (such as MSSO APIs module 218a). App authentication module 222i may retrieve mobile application 104's credentials via MSSO APIs module 218a. Mobile application 104's credentials may be one or more application keys. The application keys may have been previously provided in a process that is described in greater detail in connection with FIG. 4.

As part of the authentication step 320, App authentication module 222i and/or communicator module 222h may transmit mobile application 104's credentials to MSSO server 112. Credentials may be transmitted using one or more secure connections, using, for example, network 120 (as shown in FIG. 1). Method 300 may proceed to step 325.

At step 325, MSSO Server 112 may compare the received credentials to credentials stored at MSSO Server 112 or SSO database 118. A mobile application's credentials may have been previously provided to MSSO Server 112 during the application creation process, as will be described in greater detail in connection with FIG. 4. If MSSO Server 112 finds that the received credentials match the stored credentials, MSSO Server 112 may transmit one or more authentication signals to Business logic module 222, and the process may continue to step 335.

If the MSSO Server 112 does not find a match for the received credentials, MSSO Server 112 may transmit one or more termination signals to Business logic module 222, as shown in step 330. If business logic module 222 receives a termination signal from MSSO Server 112, MSSO Application 210 will cause one or more notifications to be displayed on the screen of mobile device 102, informing the user that the application could not be authenticated, and the process will be ended. The App authentication module 222i or ErrorHandler module 222g may return store an error code which describes the reason or reasons for the authentication failure. The error code may include instructions that the App team 122 can follow in order to retrieve the correct credentials for application.

If the credentials match, method 300 may proceed to step 335. At step 335, if business logic module 222 has received one or more authentication signals from MSSO Server 112, Integration module 218 may use the application credentials to unlock mobile application 104's code to allow it to access other functionality (for example, other modules) of MSSO application 210. The mobile application 104 may check shared memory 202 to determine whether any session information is currently stored there. Mobile application 104 may check shared memory using SessionManager module 222f or TokenStorage module 222c.

For example, assuming the user has previously signed-on using another MSSO-enabled mobile application on mobile device 102, then the session information from that sign-on may have already been stored in shared memory 202 of mobile device 102. If SessionManager module 222f finds session information in shared memory 202, method 300 may proceed to block 370.

At step 335, if no session information is stored in shared memory 202, this may indicate that the user is currently signed-off (i.e., the user is offline). It may indicate that the user's previous session has timed out. It may indicate that the users previous session has been disconnected or terminated. In any event, if mobile application 104 or SessionManager 222f does not find any session information stored in shared memory 202, mobile application 104 may invoke UI module 216 to query the user for his or her user credentials. UI module 216 may interface with mobile application 104 to present the user with one or more interactive screens where the user can enter user credentials, such as a username and password. UI module 216 may be configured to display a common screen to the user regardless of which mobile application the user is currently using. Method 300 may then proceed to step 340.

At step 340, UI module 216 may receive user credentials that the user has entered. UI module 216 may then transmit the user credentials to MSSO Server 112 using UserAuthentication module 222b and/or Communicator module 222h. UI Module 216 may also transmit the mobile device identifier to MSSO Server 112 using communicator module 222h. The user credentials and/or device identifier may be securely transmitted to MSSO Server 112 in an encrypted form. Method 300 may then proceed to block 350.

At block 350, MSSO Server 112 may authenticate the user based on at least one of the received user credentials and device identifier. The MSSO Server 112 may use the received device identifier to retrieve a user profile from SSO database 118. Once retrieved, the user profile may be compared to the received user credentials. For example, the received user credentials may include a username and a password. The retrieved user profile may also contain a username and password that can be compared to those in the user credentials. At step 355, if one or more components of the received user credentials matches the information stored in the user profile, MSSO Server 112 may determine that the user has been authenticated, and method 300 may proceed to step 360. If the user credentials does not match the stored user information, MSSO Server 112 may transmit one or more notifications to MSSO application 210, indicating that the user credentials were not authenticated (shown in step 330). The notification may request that the user try again. UI Module 216 may give the user a limited number of chances to enter the correct user credentials before locking out the user for a predetermined amount of time.

At step 360, if the user credentials were authenticated, MSSO Server 112 may retrieve the user profile from SSO database 118. MSSO Server 112 may transmit session information to mobile device 102. The session information may include a session cookie and the user profile. The session information may comprise an encrypted token. MSSO application 210 may receive the session information via SessionManager module 222f. Method 300 may proceed to step 380.

At step 380, upon receipt of the session information, Integration module 218 may allow mobile application 104 to access the session information. TokenStorage module 222c may store the session information in shared memory 202. Once stored in shared memory 202, the session information may be commonly available across all MSSO-enabled mobile applications using Integration module 218. The user may now have access to the secure network through the session with MSSO Server 112. Each time a mobile application attempts to access the secure network via MSSO Server 112 (or another network enabled computer), the mobile device must present the encrypted token.

Returning to step 335, mobile application 104 may check shared memory using SessionManager module 222f. If the user has already signed-on using another MSSO-enabled mobile application on mobile device 102, then the session information for that session will have already been stored in shared memory 202 of mobile device 102. If SessionManager module 222f determines that the session information is already present in shared memory, SessionManager module 222f will retrieve the stored session information and make it available to the mobile application 104 using Integration module 218, as described above in step 380. Thus, a user is provided with a secure session across multiple applications using a single sign-on process.

MSSO application 210 may also provide sign-off capabilities to allow a user of mobile device 102 to end his session with MSSO server 112. UI Module 216 may include a SignOff 216b module that is integrated with each MSSO-enabled mobile application. The sign-off option may be presented as a button or other GUI on the screen of the mobile device. When the user selects or "clicks" on the sign-off option, the session may be ended and SessionManager 222f may delete the session information from shared memory 202. The next time the user opens or accesses an MSSO-enabled mobile application on his mobile device 102, the user will have to sign-on for a new secure session, as shown in blocks 335-360 of FIG. 3.

The session information may be time-limited. The session may automatically timeout after a set period of time has elapsed following sign-in. SessionManager 222f may be configured to automatically delete the session information if the user has been inactive for a certain period of time. Once the set time period elapses, SessionManager 222f may automatically delete the session information from the shared memory 202 and call the Single Sign On timeout event which will be captured on Common Events 218b module runs on application code base. The next time the user opens a mobile application following a session timeout, the user will have to sign-on for a new secure session, as shown in blocks 335-360 of FIG. 3.

Figure 4:
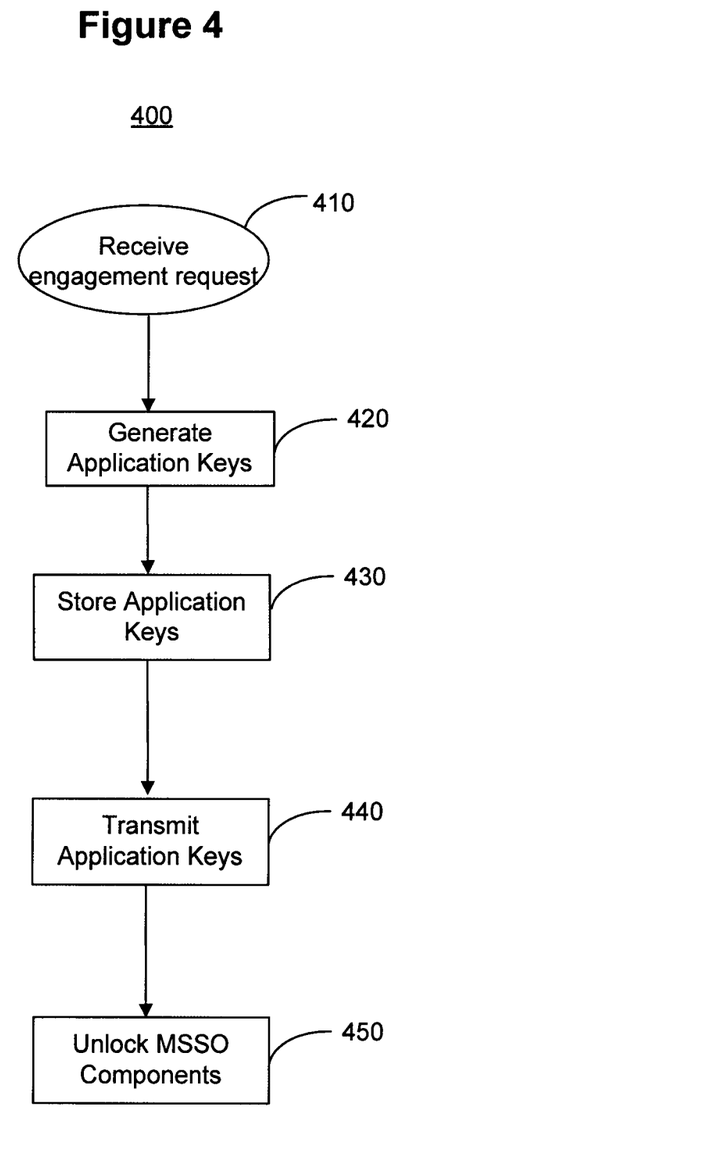
FIG. 4 is a block diagram a method of a particular embodiment.

FIG. 4 illustrates a flow diagram of a method 400 for integrating a mobile application with the MSSO application. This exemplary method 400 is provided by way of example, as there are a variety of ways to carry out the method. The method 400 shown in FIG. 4 can be executed or otherwise performed by one or a combination of various systems. The method 400 described below may be carried out by the systems shown in FIGS. 1 and 2, by way of example, and various elements of system 100 are referenced in explaining the exemplary method of FIG. 4. Each step shown in FIG. 4 represents one or more processes, methods or subroutines carried out in exemplary method 400. Referring to FIG. 4, exemplary method 400 may begin at block 410.

At block 410, method 400 may receive an engagement request. The engagement request may be sent by an app team that developed the mobile application, such as app team 122 (shown in FIG. 1). App team 122 may transmit the engagement request to provisional portal 114. The engagement request may include information about the mobile application that was developed by app team 122. The engagement request may include a description of the application, its functions and capabilities. Engagement request may be transmitted electronically using one or more templates provided by provisional portal 114. Method 400 may proceed to block 420.

At block 420, method 400 may generate an application key. Application keys may be generated based on whether the engagement request is approved. Application keys may include an engagement key and an application code key. The application key may be unique to the mobile application associated with the engagement request. The application key may be generated by MSSO server 112. The application key may be generated by one or more other network-enabled computers. Method 400 may proceed to block 430.

At block 430, method 400 may store the application key. MSSO Server 112 may store the application key at SSO Database 118. The application key may be stored as application credentials (as discussed in connection with the application authentication step in FIG. 3). Application credentials may be unique to the developed mobile application. The application key may be initially enabled for a non-production environment. The application key may be enabled for both a production and non-production environment. Method 400 may proceed to block 440.

At block 440, method 400 may transmit the application key to the application team (such as app team 122). MSSO Server 112 may transmit the application key to the application development team. The application key may be delivered over one or more secure channels. The application key may be emailed. The application key may be encrypted. Method 400 may proceed to block 450.

At block 450, the application team (such as app team 122) may provide the application key to the mobile application. The mobile application may use the application key to unlock one or more components or modules of the MSSO application 210 on mobile device 102. For example, if mobile application 104 has been developed and has received its unique application key, mobile application 104 may use the application key to interface with Integration module 218 of MSSO application 210 on mobile device 102. Mobile application 104 may use the application key to unlock the functionality of MSSO application 210 and utilize other modules, such as UI module 216 and Business logic module 222.

It is to be appreciated that the set of instructions, e.g., the software that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A system, comprising:
one or more network-enabled computers to:
receive a first set of data from a mobile device that includes a single sign on (SSO) application that enables access to multiple mobile applications using a single sign-on interface,
the first set of data including application credentials of a mobile application, of the multiple mobile applications, that is installed on the mobile device and integrated with the SSO application;
perform a first comparison of the first set of data to a first set of stored information;
when the first set of data matches the first set of stored information, transmit an authentication signal;
receive a second set of data from the SSO application of the mobile device after the mobile device receives the authentication signal and determines that session information is not stored in a memory associated with the mobile device,
the session information including a session cookie or a token issued by the one or more network-enabled computers;
perform a second comparison of the second set of data to a second set of stored information,
the second set of data including one or more credentials associated with a user of the mobile device; and
establish a communication session with the mobile device based on the second comparison.

2. The system of claim 1, wherein the application credentials comprise one or more keys associated with the mobile application.

3. The system of claim 1, wherein the second set of stored information comprises a plurality of stored credentials associated with the user.

4. The system of claim 1, wherein the communication session is established if at least one of the one or more credentials associated with the user matches at least one credential of the second set of stored information.

5. The system of claim 1, wherein establishing the communication session comprises transmitting the session information to the mobile device.

6. The system of claim 5, wherein the session information further comprises a user profile.

7. The system of claim 5, wherein the token issued by the one or more network-enabled computers is an encrypted token.

8. A method comprising:
receiving, by a server, a first set of data from a mobile device that includes a single sign on (SSO) application that enables access to multiple mobile applications using a single sign-on interface,
the first set of data including application credentials of a mobile application, of the multiple mobile applications, that is installed on the mobile device and integrated with the SSO application;
comparing, by the server, the first set of data to a first set of stored information;
transmitting, by the server, an authentication signal based on comparing the first set of data to the first set of stored information;
receiving, by the server, a second set of data from the SSO application of the mobile device after the mobile device receives the authentication signal and determines that session information is not stored in a memory associated with the mobile device,
the session information including a session cookie or a token issued by the server;
comparing, by the server, the second set of data to a second set of stored information,
the second set of data comprising one or more credentials associated with a user of the mobile device; and
establishing, by the server, a communication session with the mobile device based on comparing the first set of data to the first set of stored information.

9. The method of claim 8, wherein the second set of data further comprises a device identifier of the mobile device.

10. The method of claim 8, where the SSO application of the mobile device determines that the session information is not stored in the memory associated with the mobile device.

11. The method of claim 8, further comprising:
receiving an engagement request from a developer of the mobile application;
generating the application credentials based on the engagement request; and
storing the application credentials as the first set of stored information.

12. The method of claim 11, further comprising:
transmitting the application credentials to the developer for the developer to provide the application credentials to the mobile application.

13. The method of claim 8,
where the second set of data comprises a device identifier of the mobile device, and
where the method further comprises:
retrieving a profile based on the device identifier, and
where the profile includes the second set of stored information.

14. The method of claim 8, further comprising:
receiving the application credentials during a process that creates the mobile application, and storing the application credentials as the first set of stored information.

15. The method of claim 8, wherein the application credentials comprise one or more keys associated with the mobile application.

16. A method comprising:
receiving one or more commands at a mobile device that includes a single sign on (SSO) application that enables access to multiple mobile applications using a single sign-on interface;
starting a program, of the multiple mobile applications, on the mobile device based on the one or more commands;
transmitting, by the mobile device, a first set of data to a remote server,
   the first set of data including application credentials of the program;
receiving, by the mobile device and from the remote server, an authentication signal that indicates that the first set of data matches a first set of stored information that is stored by the remote server;
checking, by the mobile device and after receiving the authentication signal from the remote server, a memory on the mobile device to determine whether session information is stored in the memory,
   the session information including a session cookie or a token issued by the remote server; and
if the session information is stored in the memory, the method comprises:
   providing, by the mobile device, the session information to the remote server; or
if the session information is not stored in the memory, the method comprises:
   capturing, by the SSO application of the mobile device, one or more user credentials input by a user of the mobile device,
   transmitting, by the mobile device, the one or more user credentials to the remote server,
   receiving, by the mobile device, the session information from the remote server,
   providing, by the mobile device, the session information to the program, and
   storing, by the mobile device, the session information in the memory.

17. The method of claim 16, wherein the program comprises a browser-based mobile application.

18. The method of claim 16, wherein the program is configured to perform one or more business-related functions for a business employee.

19. The method of claim 16, wherein the session information is associated with a session between the mobile device and the remote server that was previously initiated by the user of the mobile device using a different program of the multiple mobile applications.

20. The method of claim 19, wherein the session information further comprises a profile associated with the user of the mobile device.

21. The method of claim 19, wherein the token issued by the remote server comprises an encrypted token.

22. The method of claim 16, wherein the one or more user credentials input by the user include at least one of: a username, a password, or biometric information associated with the user.

23. The method of claim 16, wherein the session information is associated with a communication session between the mobile device and the remote server.

* * * * *